(12) United States Patent
Sato et al.

(10) Patent No.: US 11,500,389 B2
(45) Date of Patent: Nov. 15, 2022

(54) VEHICLE CONTROL DEVICE

(71) Applicant: Toyota Jidosha Kabushiki Kaisha, Toyota (JP)

(72) Inventors: Minami Sato, Ebina (JP); Kazuyuki Fujita, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 25 days.

(21) Appl. No.: 16/724,926

(22) Filed: Dec. 23, 2019

(65) Prior Publication Data

US 2020/0218268 A1 Jul. 9, 2020

(30) Foreign Application Priority Data

Jan. 4, 2019 (JP) .............................. JP2019-000133

(51) Int. Cl.
  *G05D 1/02* (2020.01)
  *B62D 6/00* (2006.01)

(52) U.S. Cl.
  CPC ........... *G05D 1/0214* (2013.01); *B62D 6/001* (2013.01); *G05D 2201/0212* (2013.01)

(58) Field of Classification Search
  CPC ......... G05D 1/0214; G05D 2201/0212; B62D 6/001
  See application file for complete search history.

(56) References Cited

U.S. PATENT DOCUMENTS

| 9,701,307 | B1 * | 7/2017 | Newman ................ G08G 1/166 |
| 10,040,450 | B1 * | 8/2018 | Pal ....................... G05D 1/0088 |
| 10,259,452 | B2 * | 4/2019 | Gordon ................. B60W 30/09 |
| 10,392,011 | B2 * | 8/2019 | Nagraj Rao ...... B60W 30/0956 |
| 10,836,383 | B2 * | 11/2020 | Ersal ................. B60W 50/0097 |
| 10,940,857 | B2 * | 3/2021 | Lee ........................ B60W 30/09 |
| 10,967,824 | B1 * | 4/2021 | Pertsel .............. B60R 21/01538 |
| 11,016,493 | B2 * | 5/2021 | Taylor .................. G05D 1/0214 |
| 2011/0187515 | A1 | 8/2011 | Saito et al. |
| 2012/0072050 | A1 | 3/2012 | Naka |
| 2015/0210279 | A1 | 7/2015 | Agnew et al. |
| 2018/0093631 | A1 * | 4/2018 | Lee ...................... G06V 20/593 |

(Continued)

FOREIGN PATENT DOCUMENTS

| CN | 108256233 A | * | 7/2018 |
| JP | H9185412 A | | 7/1997 |

(Continued)

*Primary Examiner* — Jeff A Burke
*Assistant Examiner* — Jerrod Irvin Davis
(74) *Attorney, Agent, or Firm* — Dinsmore & Shohl LLP

(57) ABSTRACT

A vehicle control device is configured to include a steering control unit. The steering control unit is configured to perform a steering control such that a vehicle passes between a first obstacle of which a position in a lateral direction is closest to the vehicle, among one or multiple obstacles existing ahead of the vehicle on a left side of the traveling direction and a second obstacle of which a position in the lateral direction is closest to the vehicle, among one or multiple obstacles existing ahead of the vehicle on a right side of the traveling direction, and if there exists a third obstacle closer to the vehicle than the first obstacle and the second obstacle, inhibit the steering control to one side where the third obstacle exists either on the left side of the traveling direction or the right side of the traveling direction.

2 Claims, 4 Drawing Sheets

(56) References Cited

U.S. PATENT DOCUMENTS

| | | | |
|---|---|---|---|
| 2018/0186366 A1* | 7/2018 | Gordon | B60W 30/09 |
| 2018/0238696 A1* | 8/2018 | Takeda | G01C 21/3602 |
| 2019/0054876 A1* | 2/2019 | Ferguson | B60R 19/18 |
| 2019/0202449 A1* | 7/2019 | Taveira | G05D 1/0202 |
| 2020/0070819 A1* | 3/2020 | Tominaga | G08G 1/166 |
| 2020/0079362 A1* | 3/2020 | Kingman | G05D 1/0227 |
| 2020/0081443 A1* | 3/2020 | Nakata | G05D 1/0088 |
| 2020/0125092 A1* | 4/2020 | Sham | G05D 1/0088 |
| 2020/0160059 A1* | 5/2020 | Choi | G06N 3/0445 |
| 2020/0198628 A1* | 6/2020 | Matsunaga | G08G 1/166 |
| 2021/0094577 A1* | 4/2021 | Shalev-Shwartz | G06V 20/58 |
| 2021/0213972 A1* | 7/2021 | Forsberg | B60W 30/0956 |

FOREIGN PATENT DOCUMENTS

| | | | |
|---|---|---|---|
| JP | 2009-217491 A | 9/2009 | |
| JP | 2010-070069 A | 4/2010 | |
| JP | 2015-155295 A | 8/2015 | |
| JP | 2016-081403 A | 5/2016 | |
| WO | 2010/137569 A1 | 12/2010 | |

* cited by examiner

VEHICLE CONTROL DEVICE

CROSS-REFERENCE TO RELATED APPLICATIONS

This application claims priority to Japanese Patent Application No. 2019-000133 filed Jan. 4, 2019 which is incorporated herein by reference in its entirety including the specification, claims, drawings, and abstract.

TECHNICAL FIELD

The present disclosure relates to a vehicle control device.

BACKGROUND

Japanese Unexamined Patent Publication No. 2016-81403 discloses a vehicle that can travel along a planned path set in advance. In the technology disclosed in Japanese Unexamined Patent Publication No. 2016-81403, in order to avoid interference with obstacles existing on a left side and on a right side in the forwarding direction of the vehicle, the planned path is offset such that the vehicle passes between these obstacles.

SUMMARY

In the vehicle control device described above, the interference with the obstacles existing on each of the left side of the traveling direction and on the right side of the traveling direction is avoided by performing a steering control (offset of the planned path) of the vehicle. However, if there are other obstacles existing ahead of these obstacles, depending on the aspect of the steeling control, the vehicle may approach those other obstacles too close, which may cause the occupants of the vehicle to feel discomfort.

An aspect of the present disclosure provides a vehicle control device that can reduce the discomfort to the occupants of the vehicle.

According to an aspect of the present disclosure, there is provided a steering control unit configured to perform a steering control of a vehicle based on a surrounding environment and a travel state of the vehicle. The steering control unit is configured to perform the steering control such that the vehicle passes between a first obstacle of which a position in a lateral direction is closest to the vehicle, among one or multiple obstacles existing ahead of the vehicle on a left side of the traveling direction and a second obstacle of which a position in the lateral direction is closest to the vehicle, among one or multiple obstacles existing ahead of the vehicle on a right side of the traveling direction, and if there exists a third obstacle closer to the vehicle than the first obstacle and the second obstacle, inhibit the steering control to one side where the third obstacle exists either on the left side of the traveling direction or the right side of the traveling direction.

According to the vehicle control device, if there exist the third obstacle that are closer to vehicle than the first obstacle and the second obstacle respectively either on the left side of the traveling direction or the right side of the traveling direction, the steering control to approach to one side where the third obstacle exists is suppressed, and thus, the approach of the vehicle to the third obstacle is suppressed, and thus, the vehicle is suppressed to approach the third obstacle. Therefore, the discomfort to the occupants of the vehicle due to the approach to the third obstacles can be reduced.

In an aspect of the present disclosure, the steering control unit may be configured not to inhibit the steering control if an occupant is not present in the vehicle and a living organism is not included in the third obstacle. If the occupant is not present in the vehicle and the living organism is not included in third obstacle, in the vehicle and the third obstacle, there is no target to which the discomfort is given. Accordingly, in this case, it becomes easier to perform the steering control with an emphasis on reducing the risk of collision with the first obstacle and the second obstacle because the steering control is not suppressed. Therefore, it is possible to reliably avoid the interference with the first obstacle and the second obstacle.

According to various aspects and embodiments of the present disclosure, the discomfort to the occupants of the vehicle can be reduced.

DETAILED DESCRIPTION

Figure 1:
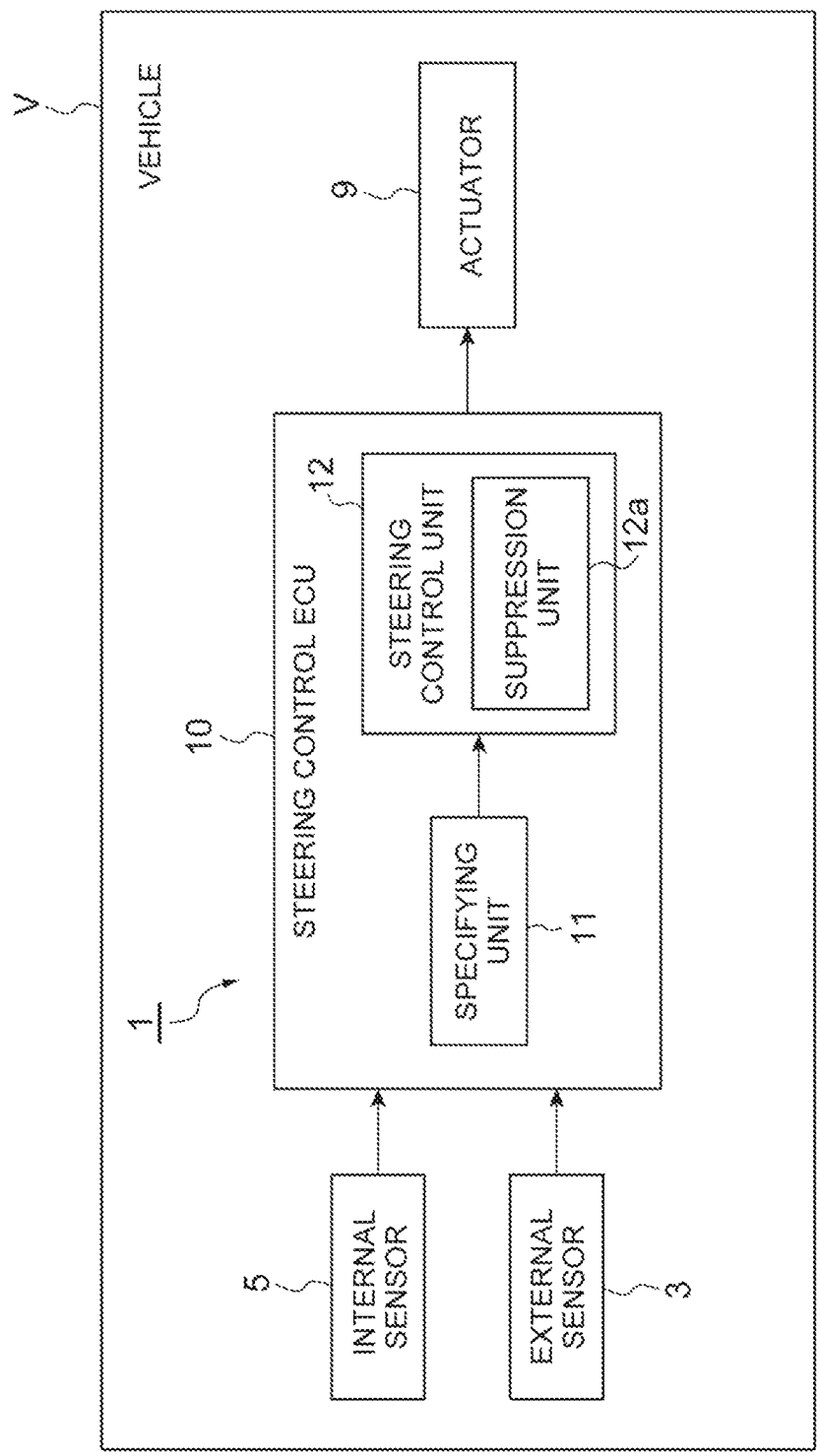
FIG. 1 is a functional block diagram of a vehicle that includes a vehicle control device according to a first embodiment.

Hereinafter, exemplary embodiments will be described with reference to the drawings. In the description below, the same reference numerals will be given to the same or corresponding elements, and the descriptions thereof will not be repeated.

First Embodiment

FIG. 1 is an exemplary functional block diagram of a vehicle V that includes a vehicle control device 1 according to a first embodiment. As illustrated in FIG. 1, the vehicle control device 1 is mounted on the vehicle V such as a passenger car. The vehicle V includes an external sensor 3, an internal sensor 5, and an actuator 9.

The external sensor 3 is a detection device that detects a surrounding environment of the vehicle V. The external sensor 3 detects a position of an object ahead of the road on which the vehicle V is traveling. The external sensor 3 includes at least one of a camera and a radar sensor. The camera is an imaging device that images a surrounding environment of the vehicle V. As an example, the camera is provided on the inside of a windshield of the vehicle V. The camera acquires imaging information relating to the surrounding environment of the vehicle V. The camera may be a monocular camera or may be a stereo camera. The stereo camera includes two imaging units arranged to reproduce binocular parallax. The imaging information of the stereo camera also includes information in the depth direction. The radar sensor is a detection device that detects objects around the vehicle V using at least one of radio waves (for example, millimeter waves) and light. The radar sensor includes, for example, at least one of the millimeter wave radar and a laser imaging detection and ranging (LIDAR). The radar sensor transmits at least one of the radio wave and light to the surroundings of the vehicle V, and detects the objects by receiving radio waves or light reflected from the objects.

The internal sensor 5 is a detection device that detects a traveling state of the vehicle V. The internal sensor 5 includes a vehicle speed sensor, an accelerator sensor, and a yaw rate sensor. The vehicle speed sensor is a measuring device that measures a speed of the vehicle V. As the vehicle speed sensor, for example, a vehicle wheel speed sensor is used, which is provided on vehicle wheels of the vehicle V or on a drive shaft rotating integrally with vehicle wheels, and measures a rotational speed of the vehicle wheels. The accelerator sensor is a measuring device that measures an acceleration of the vehicle V. The accelerator sensor includes, for example, a longitudinal accelerator sensor that measures acceleration in the longitudinal direction of the vehicle V and a lateral accelerator sensor that measures a lateral acceleration of the vehicle V. The yaw rate sensor is a measuring device that measures a yaw rate (rotational angular velocity) around the vertical axis at the center of gravity of the vehicle V. As the yaw rate sensor, for example, a Gyro sensor can be used.

The actuator 9 is a device that performs a steering control of the vehicle V. The actuator 9 at least includes an engine actuator, a brake actuator, and a steering actuator. The engine actuator controls driving force of the vehicle V by changing an amount of air supplied to the engine (for example, changing the throttle opening degree) in accordance with the input control signal. When the vehicle V is a hybrid vehicle or an electric vehicle, the engine actuator controls the driving force of a motor as a power source.

The vehicle control device 1 includes a steering control ECU 10. The steering control ECU 10 is an electronic control unit including a central processing unit (CPU), read only memory (ROM), random access memory (RAM), a controller area network (CAN), and the like. The steering control ECU 10 is connected to a network that communicates using, for example, a CAN communication circuit, and is communicably connected to the configuration elements of the vehicle V described above. The steering control ECU 10 realizes various functions by, for example, inputting and outputting data using the CAN communication circuit based on a signal output from the CPU, storing the data in the RAM loading the program stored in the ROM into the RAM, and executing the program loaded in the RAM. The steering control ECU 10 may be configured with a plurality of electronic control units.

The steering control ECU 10 includes a specifying unit 11 and a steering control unit 12 as a functional configuration. The specifying unit 11 specifies a first obstacle of which the position in the lateral direction is closest to the vehicle V among one or multiple obstacles existing ahead of the vehicle V on the left side of the traveling direction, based on the surrounding environment detected by the external sensor 3. The specifying unit 11 specifies a second obstacle of which the position in the lateral direction is closest to the vehicle among one or multiple obstacles existing ahead of the vehicle V on the right side of the traveling direction. The lateral direction is a horizontal direction orthogonal of the traveling direction.

In addition, if there exists a third obstacle closer to the vehicle V than the first obstacle and the second obstacle, the specifying unit 11 specifies the third obstacle. The third obstacle is an obstacle that is present between the vehicle V and one of the first obstacle and the second obstacle that is closer to the vehicle V. The methods for the specifying unit 11 to specify the obstacles is not particularly limited, and well known various methods can be used. Fixed obstacles such as telephone poles, guardrails, trees and buildings, and moving obstacles such as pedestrians, bicycles and other vehicles can be included in the first obstacle, the second obstacle, and the third obstacle, but not particularly limited.

The steering control unit 12 performs a steering control to control the steering of the vehicle V based on the surrounding environment detected by external sensor 3 and a travel state detected by internal sensor 5. As the steering control, the steering control unit 12 controls the vehicle V to pass between the first obstacle and the second obstacle. The steering control unit 12 includes a suppression unit 12a that suppresses the steering control to one side where the third obstacle exists either on the left side of the traveling direction or the right side of the traveling direction, if there exists the third obstacle. The steering control unit 12 outputs a control signal to perform the steering control to the actuator 9. The details of the steering control by the steering control unit 12 will be described later.

If there exists the third obstacle, the steering control unit 12 determines whether or not a living organism is included in the third obstacle based on, for example, an image captured by the camera of the external sensor 3. The steering control unit 12 determines whether or not the occupants are not present in the vehicle V based on the result of detection by an occupant detection unit such as a seat sensor or an in-vehicle camera, for example. If the occupants are not present in the vehicle V and the living organisms are not included in the third obstacle, the steering control unit 12 stops the function of the suppression unit 12a and does not inhibit the steering control. Examples of the living organisms include the human being or animals.

Figure 2:
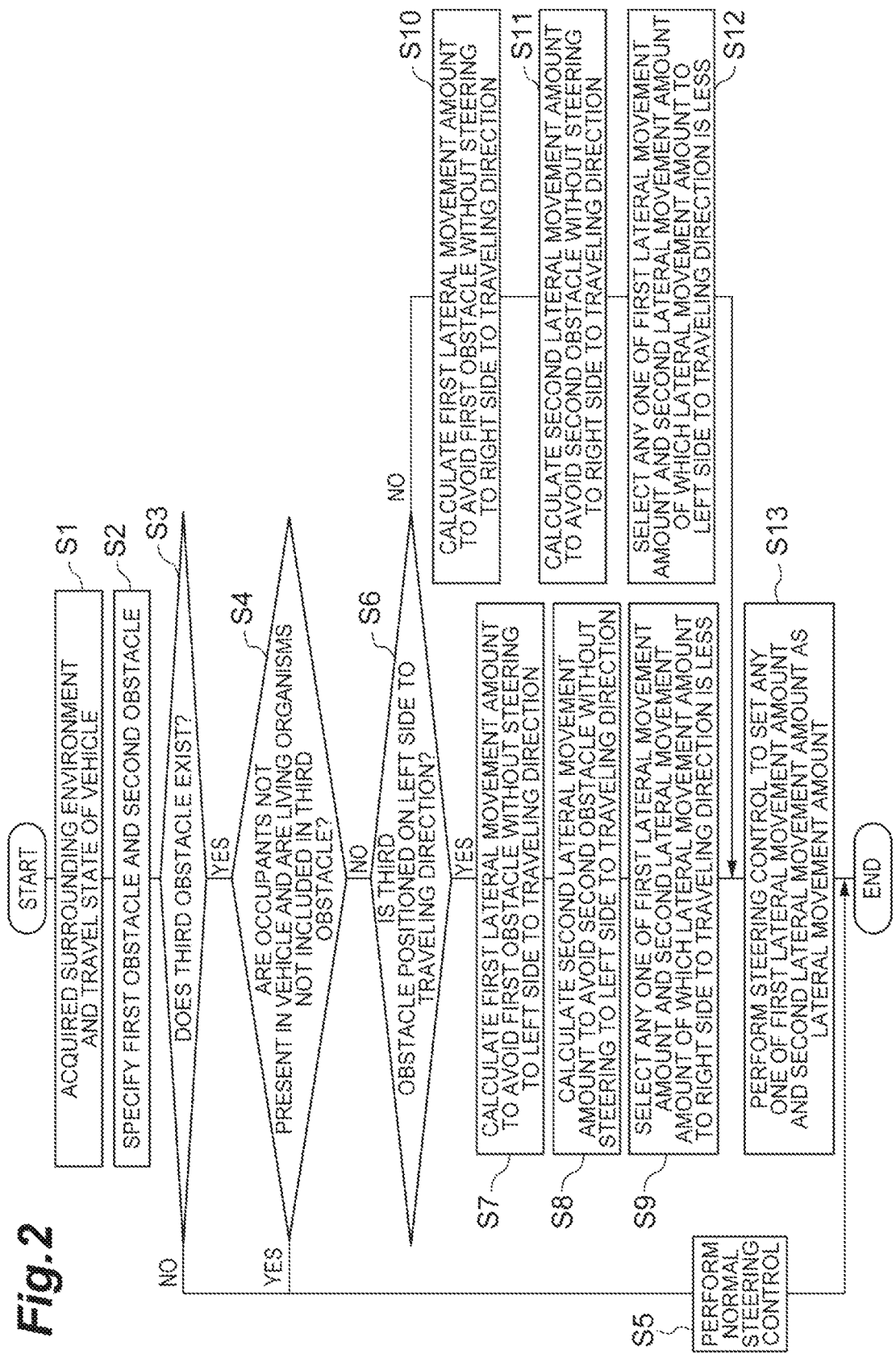
FIG. 2 is a flowchart illustrating processing by the vehicle control device according to the first embodiment.

FIG. 2 is a flowchart illustrating processing by the vehicle control device 1 according to the first embodiment. The flowchart illustrated in FIG. 2 is executed by the steering control ECU 10. The steering control ECU 10 starts the processing when the control start button is turned on, for example, by the operation by a driver.

First, the surrounding environment of the vehicle V is acquired by the external sensor 3 and the travel state of the vehicle V is acquired by the internal sensor 5 (STEP S1). The specifying unit 11 specifies the first obstacle and the second obstacle based on the surrounding environment and the travel state of the vehicle V (STEP S2). The specifying unit 11 determines whether or not the third obstacle exists based on the surrounding environment of the vehicle V (STEP S3). If YES in STEP S3, the third obstacle is specified. It is determined whether or not the occupants are not present in the vehicle V and the living organisms are not included in the third obstacle based on, for example, the image captured by the camera of the external sensor 3 and the result of detection by the occupant detection unit (STEP S4).

If NO in STEP S3 and YES in STEP S4, a normal steering control is performed. The normal steering control is, for example, a control for steering the vehicle V so as to pass through an intermediate position between the first obstacle and the second obstacle in the lateral direction. The normal steering control is not particularly limited, and various known steering controls may be performed. If NO in STEP S4, it is determined whether or not the third obstacle is positioned on the left side of the traveling direction of the vehicle V based on the result of specification of the third obstacle by the specifying unit 11 (STEP S6).

If YES in STEP S6, assuming that one side on which the third obstacle exists is the left side of the traveling direction, the suppression unit 12a suppresses the steering control to the left side of the traveling direction. Here, the steering to the left side of the traveling direction is prohibited by the suppression unit 12a. As a result, the steering control unit 12 calculates a first lateral movement amount to avoid the first obstacle without steering to the left side of the traveling direction, and calculates a second lateral movement amount to avoid the second obstacle without steering to the left side of the traveling direction (STEP S7 and STEP S8). The lateral movement amount is a movement amount of the vehicle V in the lateral direction. Any one of the first lateral movement amount and the second lateral movement amount is selected, of which the lateral movement amount to the right side of the traveling direction is less, and which can reduce the discomfort to the occupants of the vehicle V due to the approach to the second obstacle (STEP S9).

On the other hand, if NO in STEP S6, assuming that one side on which the third obstacle exists is the right side of the traveling direction, the suppression unit 12a suppresses the steering control to the right side of the traveling direction. Here, the steering to the right side of the traveling direction is prohibited by the suppression unit 12a. As a result, the steering control unit 12 calculates the first lateral movement amount to avoid the first obstacle without steering to the right side of the traveling direction, and calculates the second lateral movement amount to avoid the second obstacle without steering to the right side of the traveling direction (STEP S10 and STEP S11). Any one of the first lateral movement amount and the second lateral movement amount is selected, of which the lateral movement amount to the left side of the traveling direction is less, and which can reduce the discomfort to the occupants of the vehicle V due to the approach to the first obstacle (STEP S12).

Subsequent to STEP S9 or STEP S12, the steering control to set any one of the first lateral movement amount and the second lateral movement amount as the lateral movement amount is performed (STEP S13). Thereafter, when an end condition is not satisfied, the flowchart illustrated in FIG. 2 is started from the beginning. The end condition is, for example, satisfied when the control end button is turned on by the operation by the driver.

Figure 3A:
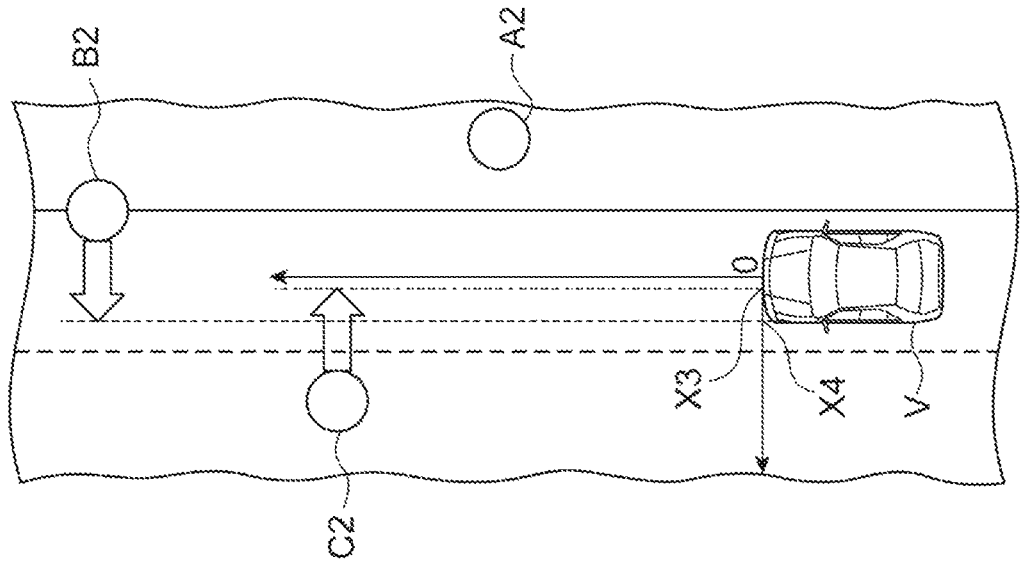
FIG. 3A is a diagram illustrating an example in which a third obstacle exists on the left side of the traveling direction to the vehicle.

FIG. 3A is a diagram illustrating an example in which a third obstacle A1 exists on the left side of the traveling direction of the vehicle V. In the example in FIG. 3A, a first lateral movement amount X1 is calculated, which avoids a first obstacle C1 without steering to the left side of the traveling direction. A second lateral movement amount X2 is calculated, which avoids a second obstacle B1 without steering to the left side of the traveling direction. The second lateral movement amount X2 of which the lateral movement amount to the right side of the traveling direction is less is selected from the first lateral movement amount X1 and the second lateral movement amount X2. Then, the steering control to set the second lateral movement amount X2 as the lateral movement amount is performed.

Figure 3B:
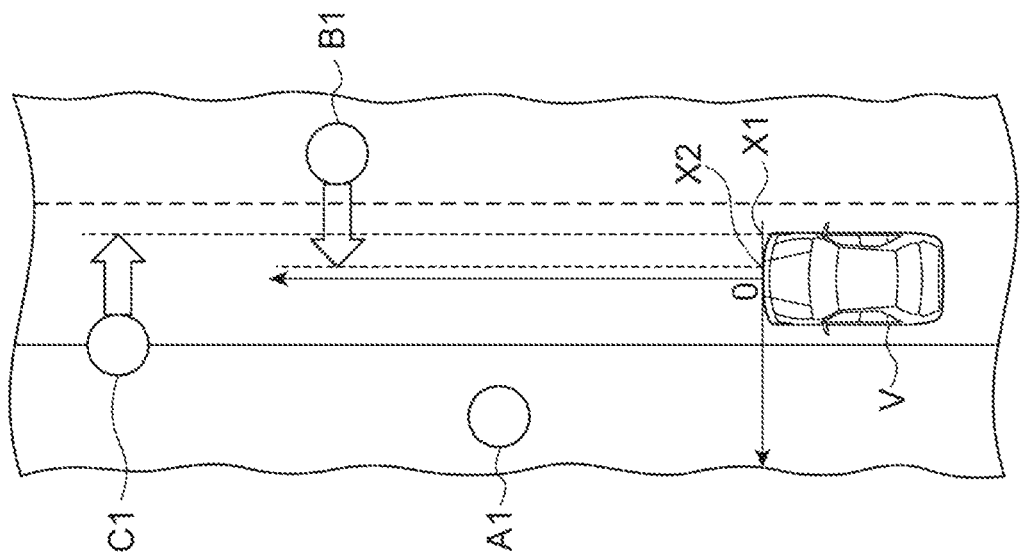
FIG. 3B is a diagram illustrating an example in which the third obstacle exists on the right side of the traveling direction of the vehicle.

FIG. 3B is a diagram illustrating an example in which a third obstacle A2 exists on the right side of the traveling direction of the vehicle V. In the example in FIG. 3B, a first lateral movement amount X3 is calculated, which avoids a first obstacle C2 without steering to the right side of the traveling direction. A second lateral movement amount X4 is calculated, which avoids a second obstacle B2 without steering to the right side of the traveling direction. The first lateral movement amount X3 of which the lateral movement amount to the right side of the traveling direction is less is selected from the first lateral movement amount X3 and the second lateral movement amount X4. Then, the steering control to set the second lateral movement amount X3 as the lateral movement amount is performed.

As described above, according to the vehicle control device 1, if there exist the third obstacles A1 and A2 that are closer to vehicle V than the first obstacles C1 and C2 and the second obstacles B1 and B2 respectively either on the left side of the traveling direction or the light side of the traveling direction, the steering control to approach to one side where the third obstacle A1 or A2 exists is suppressed, and thus, the vehicle is suppressed to approach the third obstacle A1 and A2. Therefore, the discomfort to the occupants of the vehicle V due to the approach to the third obstacles A1 and A2 can be reduced. If the living organisms are included in the third objects A1 and A2, the discomfort to the living organisms can also be reduced.

If the occupants are not present in the vehicle V and the living organisms are not included in third obstacles A1 and A2, in the vehicle V and the third obstacles A1 and A2, there is no target to which the discomfort is given. In this point, in the vehicle control device 1, it the occupants are not present in the vehicle V and the living organisms are not included in third obstacles A1 and A2, the steering control is not suppressed. In this way, it becomes easier to perform the steering control with an emphasis on reducing the risk of collision with the first obstacles C1 and C2 and the second obstacles B1 and B2 compared to the case of suppressing the steering control. Therefore, it is possible to reliably avoid the interference with the first obstacles C1 and C2 and the second obstacles B1 and B2.

Second Embodiment

Next, a second embodiment will be described. In the second embodiment, the points different from that in the first embodiment will be described, and the redundant description will be omitted.

Figure 4:
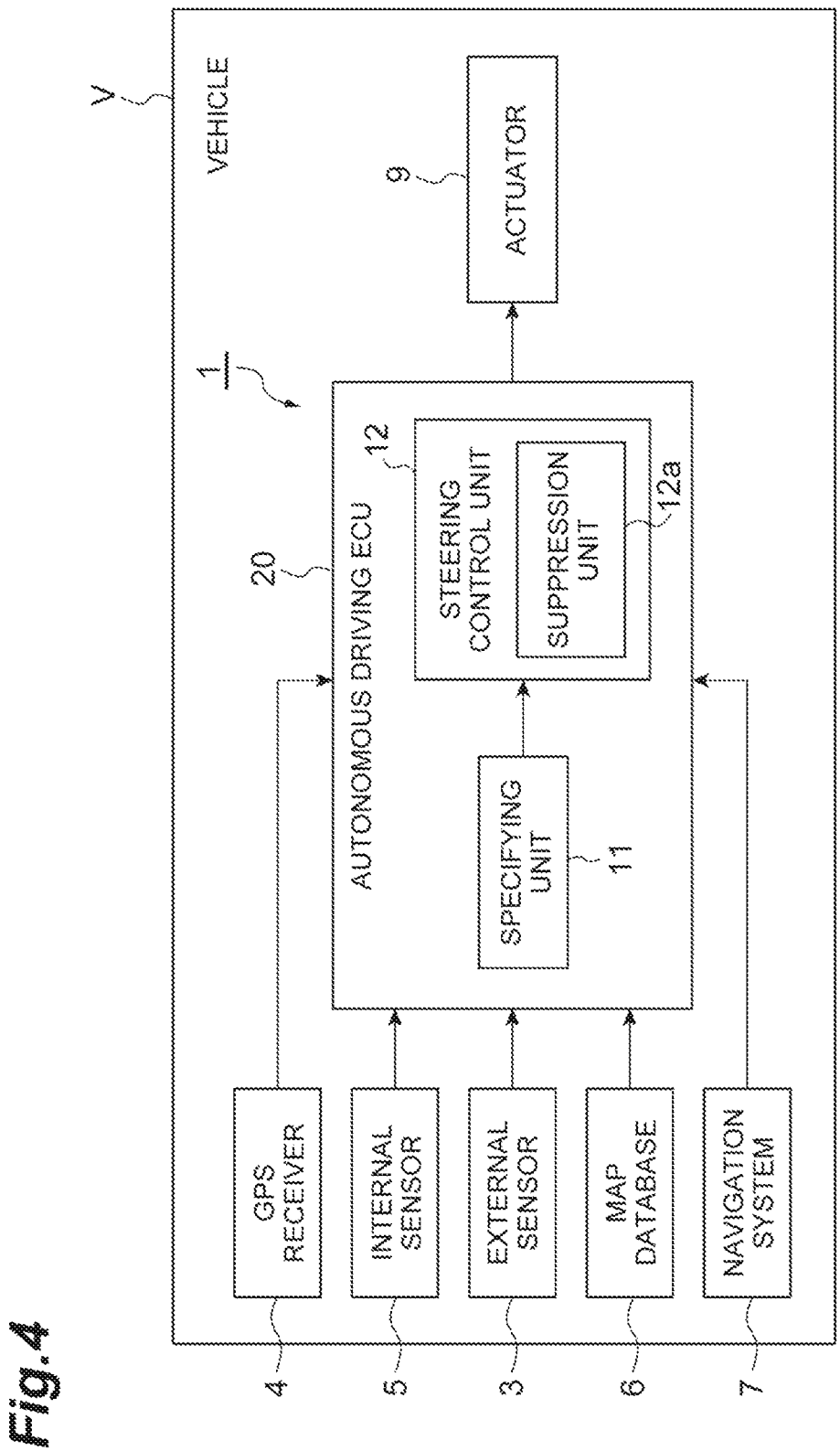
FIG. 4 is a functional block diagram of a vehicle including a vehicle control device according to a second embodiment.

FIG. 4 is a functional block diagram of a vehicle V including a vehicle control device 1 according to the second embodiment. As illustrated in FIG. 4, the vehicle V in the present embodiment is a vehicle that travels by autonomous driving. The autonomous driving is a vehicle control that causes the vehicle V to autonomously travel toward a destination set in advance. The destination may be set by the occupants such as the driver, or may be set automatically by the vehicle V. In the autonomous driving, the driver does not need to perform the driving operations, and the vehicle V travels autonomously. The vehicle V further includes a GPS receiver 4, a map database 6, and a navigation system 7.

The GPS receiver 4 receives signals from three or more GPS satellites and acquires position information indicating the position of the vehicle V. The position information includes, for example, latitude and longitude. Instead of the GPS receiver 4, another device may be used to specify the latitude and longitude where the vehicle V is positioned.

The map database 6 is a storage device that stores map information. The map database 6 is stored, for example, in a hard disk drive (HDD) mounted on the vehicle V. The map database 6 includes information on stationary objects, traffic rules, positions of traffic signal, and the like, as the map information. The stationary objects are, for example, road surface paint (including lane boundary lines such as white and yellow lines) and structures (curbs, poles, electric poles, buildings, signs, trees, and the like). A part of the map information included in the map database 6 may be stored in a storage device different From the HDD which the map database 6 is stored. A part or all of the map information included in the map database 6 may be stored in a storage device other than the storage device provided in the vehicle V.

The navigation system 7 is a system that guides the driver of the vehicle V to a destination set in advance. The navigation system 7 recognizes a traveling road and a traveling lane on and in which the vehicle V travels, based on the position of the vehicle V measured by the GPS receiver 4 and the map information in the map database 6. The navigation system 7 calculates a target route from the position of the vehicle V to the destination, and guides the driver to the target route using a human machine interface (HMI).

The vehicle control device 1 includes an autonomous driving ECU 20. The autonomous driving ECU 20 is an electronic control unit including a CPU, a ROM, a RAM, a CAN communication circuit, and the like. The autonomous driving ECU 20 is connected to a network that communicates using, for example, the CAN communication circuit, and is communicably connected to the configuration elements of the vehicle V described above. The autonomous driving ECU 20 realizes various functions by, for example, inputting and outputting data by operating the CAN communication circuit based on a signal output from the CPU, storing the data in the RAM, loading the program stored in the ROM into the RAM, and executing the program loaded in the RAM. The autonomous driving ECU 20 may be configured with a plurality of electronic control units.

The autonomous driving ECU 20 includes a specifying unit 11 and a steering control unit 12 as a functional configuration. The steering control unit 12 includes a suppression unit 12a. The autonomous driving ECU 20 generates a route for the vehicle V based on the results of detection by the external sensor 3 and the internal sensor 5, the map database 6, the position of the vehicle V, and the content of the steering control by the steering control unit 12, and the like. The autonomous driving ECU 20 generates a travel plan according to the route of the vehicle V based on the result of detection by the external sensor 3 and the map database 6. The autonomous driving ECU 20 generate the travel plan within the range not exceeding a speed limit in the traveling lane using the speed limit stored in the map database 6. In addition the autonomous driving ECU 20 generates the travel plan for the vehicle V to travel at a speed not exceeding the predetermined upper limit speed.

The autonomous driving ECU 20 outputs the generated travel plan as a set of two elements of a target position p in the coordinate system in which the route of the vehicle V is fixed to the vehicle V and a speed v at each target point, that is, multiple coordination coordinates (p, v). Here, each target position p has at least positions of x coordinate and y coordinate in the coordinate system fixed to the vehicle V, or equivalent information. The travel plan is not particularly limited as long as the behavior such as steering of the vehicle V is described. For example, in the travel plan, a target time t may be used instead of the speed v, or the target time t and the direction of the vehicle V at that time point may be added. The travel plan may be data indicating changes of the vehicle speed of the vehicle V, the acceleration and deceleration, the steering torque and the like when the vehicle V travels on the route. The travel plan may include the speed pattern of the vehicle V, the acceleration and deceleration pattern, and the steering pattern.

The autonomous driving ECU 20 autonomously controls the traveling of the vehicle V based on the generated travel plan. The autonomous driving ECU 20 outputs a control signal corresponding to the travel plan to the actuator 9. In this way the autonomous driving ECU 20 performs the autonomous driving control including the steering control of the vehicle V.

As described above, in the vehicle control device 1 according to the second embodiment also, it is possible to achieve an effect of reducing the discomfort to the occupants of the vehicle V due to the approach to the third obstacle, which is the same effect as in the first embodiment described above.

Modification Example

Various exemplary embodiments have been described above, however the present disclosure is not limited to the exemplary embodiments described above, and various omissions, substitutions, and modifications may be made.

In the embodiments described above, as the suppression of the steering control, the suppression unit 12a of the steering control unit 12 may reduce the steering amount to one side where the third obstacle exists either on the left side of the traveling direction or the right side of the traveling direction compared to a case where the third obstacle does not exist. In the embodiments described above, the steering control unit 12 may perform the steering control such that the vehicle V passes through an intermediate position between the first obstacle and the second obstacle in the lateral direction. In the present disclosure, in some cases, the first obstacle or the second obstacle, and the third obstacle may be the same object. That is, in the present disclosure, if any of the first obstacle or the second obstacle is closest to the vehicle, any one of those first obstacle or the second obstacle may configure the third obstacle.

What is claimed is:

1. A vehicle control device comprising:
    an electronic control unit configured to perform a steering control of a vehicle based on a surrounding environment and a travel state of the vehicle,
    the electronic control unit is configured to
        perform the steering control such that the vehicle passes between a first obstacle of which a position in a lateral direction is closest to the vehicle, among one or multiple obstacles existing ahead of the vehicle on a left side of a traveling direction and a second obstacle of which a position in the lateral direction is closest to the vehicle, among one or multiple obstacles existing ahead of the vehicle on a right side of the traveling direction,
        when there exists a third obstacle closer to the vehicle than the first obstacle and the second obstacle, inhibit the steering control to one side where the third obstacle exists either on one of the left side of the traveling direction or the right side of the traveling direction and perform the steering control to the other of the left side of the traveling direction or the right side of the traveling direction such that the vehicle passes the third obstacle, and
        not inhibit the steering control when an occupant is not present in the vehicle and a living organism is not included in the third obstacle.

2. The vehicle control device according to claim 1, wherein the third obstacle is a separate obstacle from the first obstacle and the second obstacle and the third obstacle is positioned in the lateral direction further away from the first obstacle and the second obstacle.

* * * * *